(12) United States Patent
Collette et al.

(10) Patent No.: US 9,340,076 B2
(45) Date of Patent: May 17, 2016

(54) DISTRIBUTED CAVITY AIR PUMPING ASSEMBLY AND METHOD FOR A TIRE

(71) Applicant: The Goodyear Tire & Rubber Company, Akron, OH (US)

(72) Inventors: Jean Joseph Victor Collette, Arlon (BE); Pit Baptiste Jean Scharle, Dalheim (LU); Frank Pierre Severens, Arlon (BE)

(73) Assignee: The Goodyear Tire Rubber Company, Akron, OH (US)

( * ) Notice: Subject to any disclaimer, the term of this patent is extended or adjusted under 35 U.S.C. 154(b) by 383 days.

(21) Appl. No.: 13/912,232

(22) Filed: Jun. 7, 2013

(65) Prior Publication Data

US 2014/0360643 A1    Dec. 11, 2014

(51) Int. Cl.
*B60C 23/10* (2006.01)
*B60C 23/12* (2006.01)
*B29D 30/00* (2006.01)

(52) U.S. Cl.
CPC ............ *B60C 23/12* (2013.01); *B29D 30/0061* (2013.01); *B29D 2030/0088* (2013.01); *Y10T 152/10495* (2015.01)

(58) Field of Classification Search
CPC ........ B60C 23/10; B60C 23/12; B60C 23/004
USPC .......................................... 152/419, 423–426
See application file for complete search history.

(56) References Cited

U.S. PATENT DOCUMENTS

| | | |
|---|---|---|
| 1,050,886 A | 1/1913 | Wetherell |
| 1,134,361 A | 4/1915 | Wetherell |
| 2,491,491 A | 12/1949 | Freygang ........................ 152/331 |
| 3,833,041 A | 9/1974 | Glad et al. ...................... 152/347 |
| 4,922,984 A | 5/1990 | Dosjoub et al. ................ 152/415 |
| 5,052,456 A | 10/1991 | Dosjoub ......................... 152/415 |
| 7,117,731 B2 | 10/2006 | Hrabal ............................... 73/146 |
| 7,225,845 B2 | 6/2007 | Ellmann ......................... 152/415 |
| 8,960,249 B2 * | 2/2015 | Lin .......................... B60C 23/12 152/419 |
| 2012/0073716 A1 | 3/2012 | Benedict ........................ 152/429 |

FOREIGN PATENT DOCUMENTS

| | | | |
|---|---|---|---|
| EP | 2433822 | 3/2012 | ............... B60C 23/12 |
| EP | 2719553 | 4/2014 | ............... B60C 23/12 |

OTHER PUBLICATIONS

European Search Report received by Applicants Oct. 24, 2014.

* cited by examiner

*Primary Examiner* — Jason Bellinger
(74) *Attorney, Agent, or Firm* — Edward T. Kennedy

(57) ABSTRACT

A tire assembly and method includes one or more elongate air passageway formed within a tire component, such as a tire sidewall. The air passageway is configured as a series or string of elongate cavities, adjacent cavities connected end to end by an elongate connecting channel. The connecting channel is dimensioned having a channel diametric size smaller than a cavity diametric size. Positioned within the tire component, the air passageway sequentially collapses segment by segment as each of the cavities pass sequentially over a rolling tire footprint. Air is pumped by the sequential air passageway collapse with the smaller dimensioned connecting channel(s) acting as valve components to directionally keep the pumped air moving between an air passageway air inlet and an air passageway air outlet and from there into the tire cavity.

19 Claims, 16 Drawing Sheets

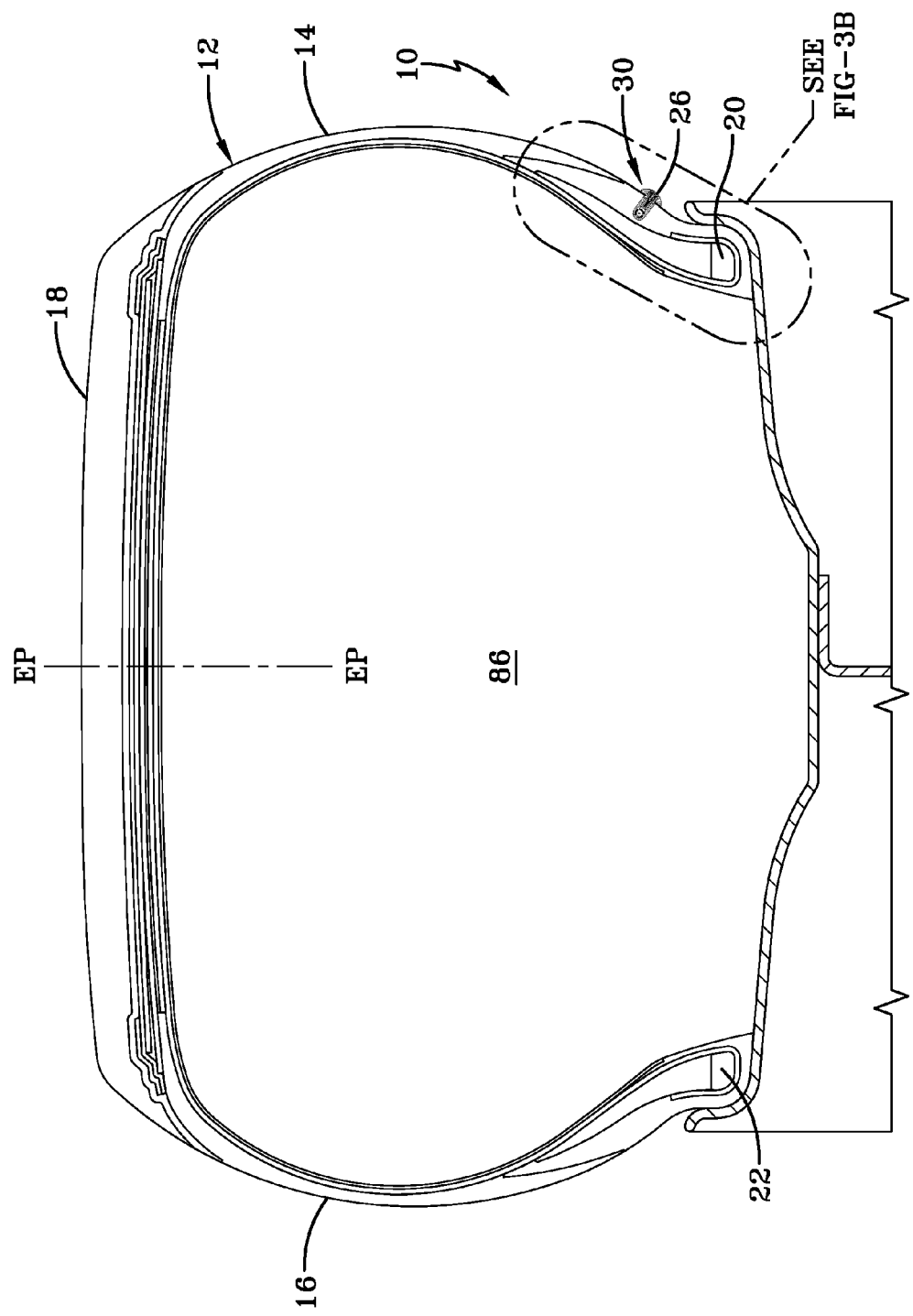

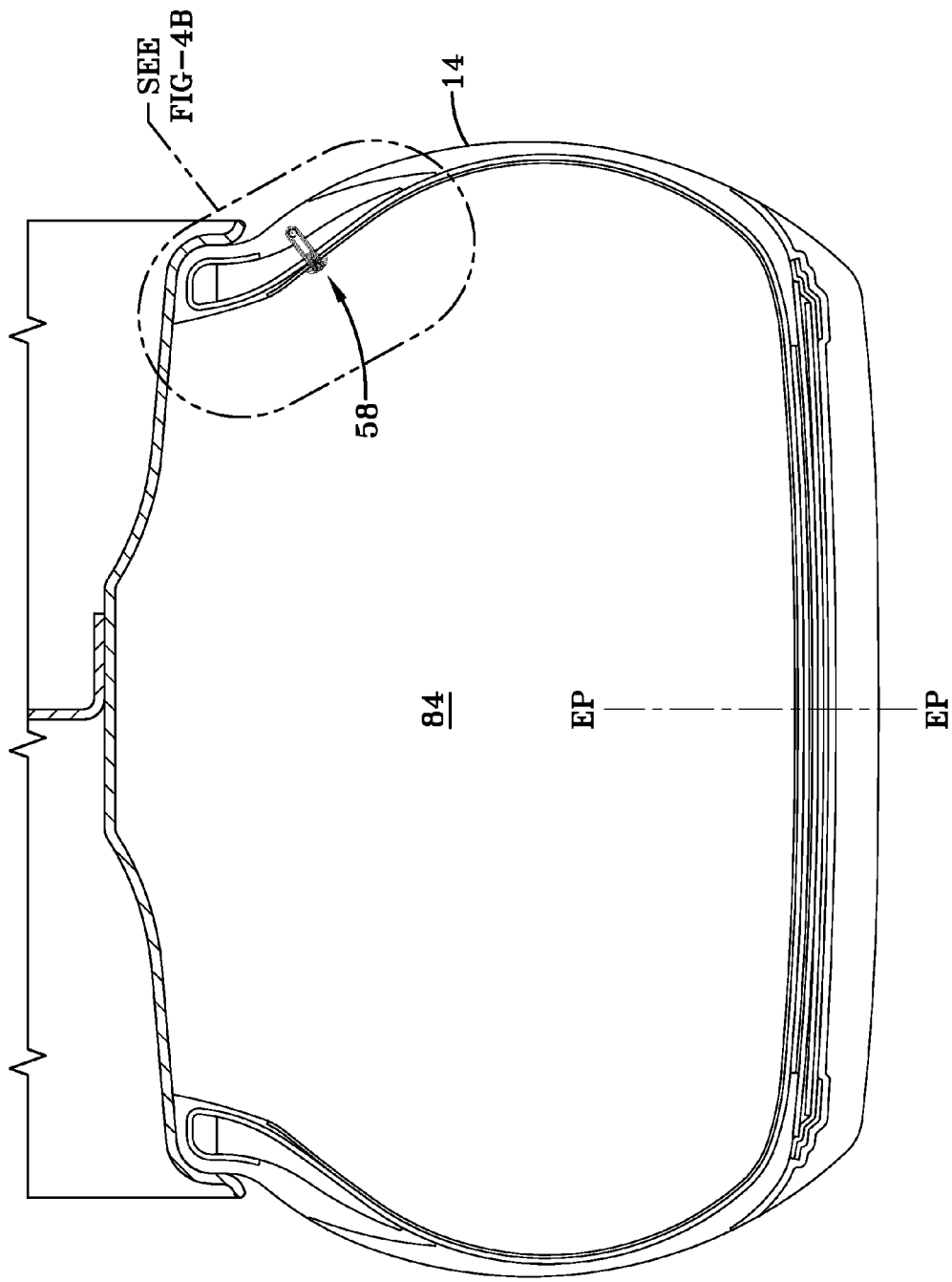

DISTRIBUTED CAVITY AIR PUMPING ASSEMBLY AND METHOD FOR A TIRE

FIELD OF THE INVENTION

The invention relates generally to air maintenance tires and, more specifically, to an air pumping passageway within a tire for maintaining air pressure within a tire cavity.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire pressure monitoring systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

In one aspect of the invention, a tire assembly and method includes one or more elongate air passageway formed within a tire component, such as a tire sidewall. The air passageway is configured as a series or string of elongate cavities, adjacent cavities connected end to end by an elongate connecting channel. The connecting channel is dimensioned having a channel diametric size smaller than a cavity diametric size. Positioned within the tire component, the air passageway sequentially collapses segment by segment as each of the cavities pass sequentially over a rolling tire footprint. Air is pumped by the sequential air passageway collapse in the rolling tire from cavity to cavity through the connecting channels between the cavities. The smaller dimensioned connecting channel(s) acts as a valve component to prevent back flow of air within the air passageway and to direct the air between an air passageway air inlet and an air passageway air outlet.

In another aspect, the adjacent cavities in the string of cavities have a respective elongate length L sized to operatively allow compression of only one cavity at a time above a rolling tire footprint. Each cavity of the air passageway and connecting channel(s) resiliently returns to an un-flattened condition when repositioned by tire rotation outside the rolling tire footprint.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 3A is a section view taken from FIG. 2 showing the inlet.

FIG. 4A is a section view taken from FIG. 2 showing the outlet.

DETAILED DESCRIPTION OF THE INVENTION

Figure 1:
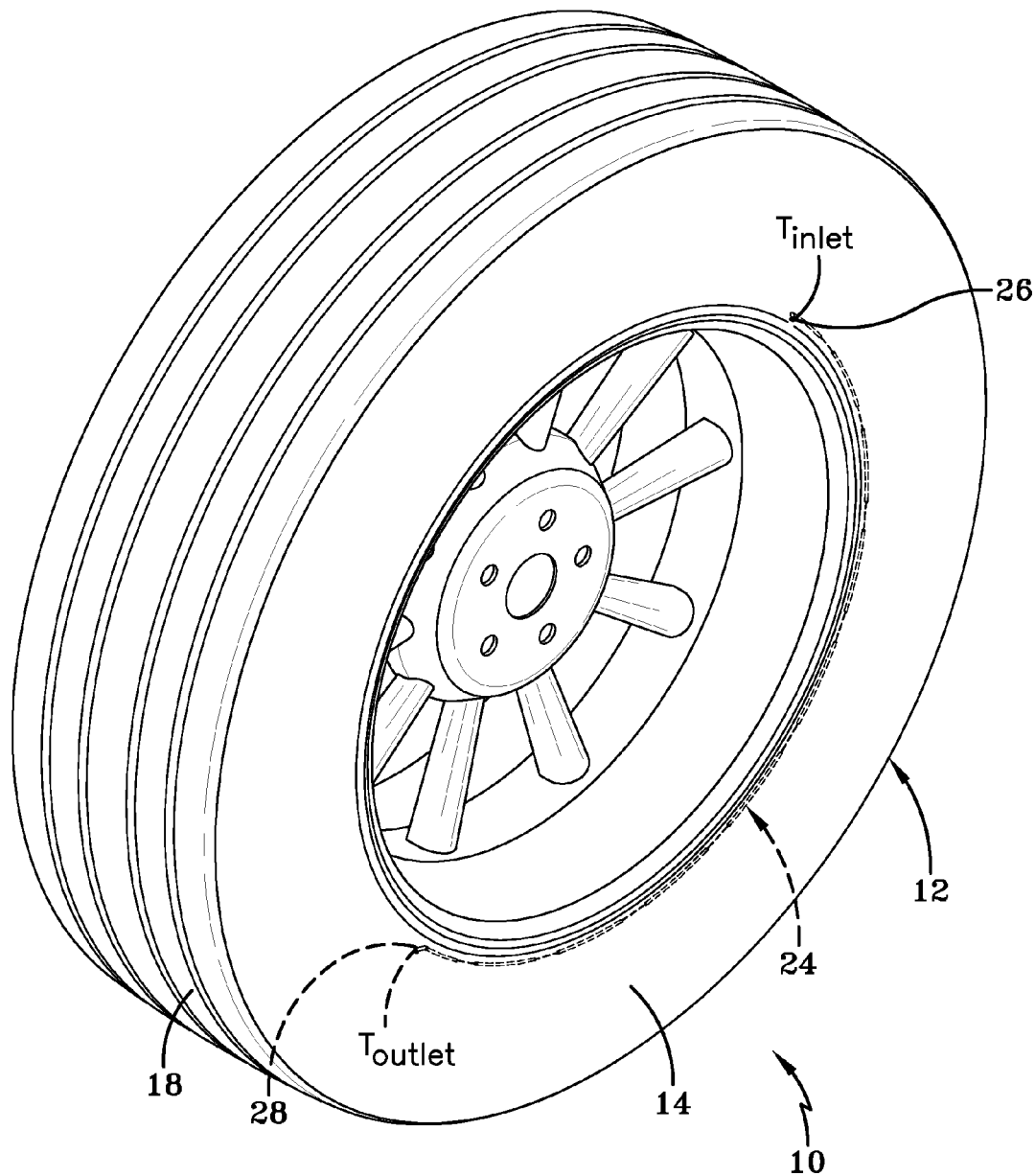
FIG. 1 is a perspective front view of tire showing inlet, outlet and vein cavity location for a 180 degree system.
Figure 2:
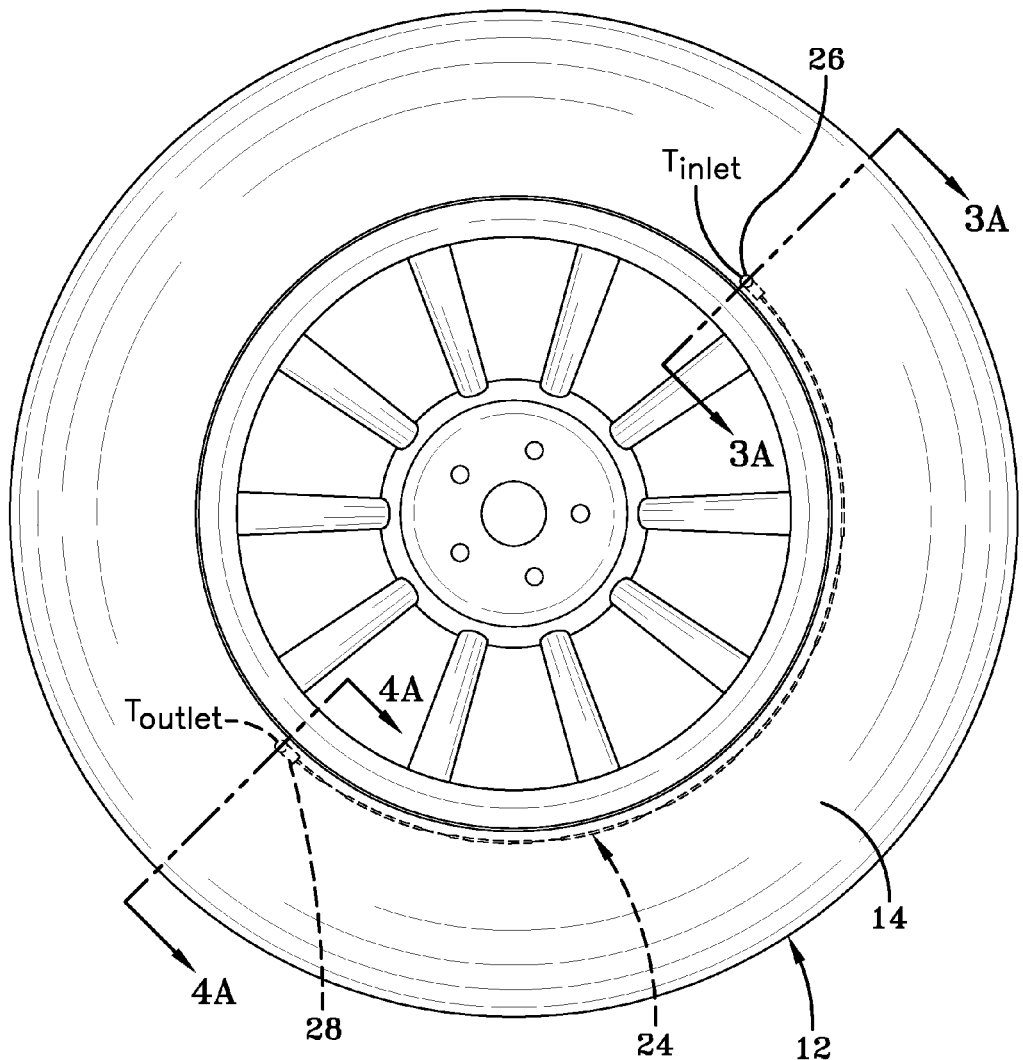
FIG. 2 is a side view of tire showing inlet, outlet and vein cavity location of 180 degree system.
Figure 2A:
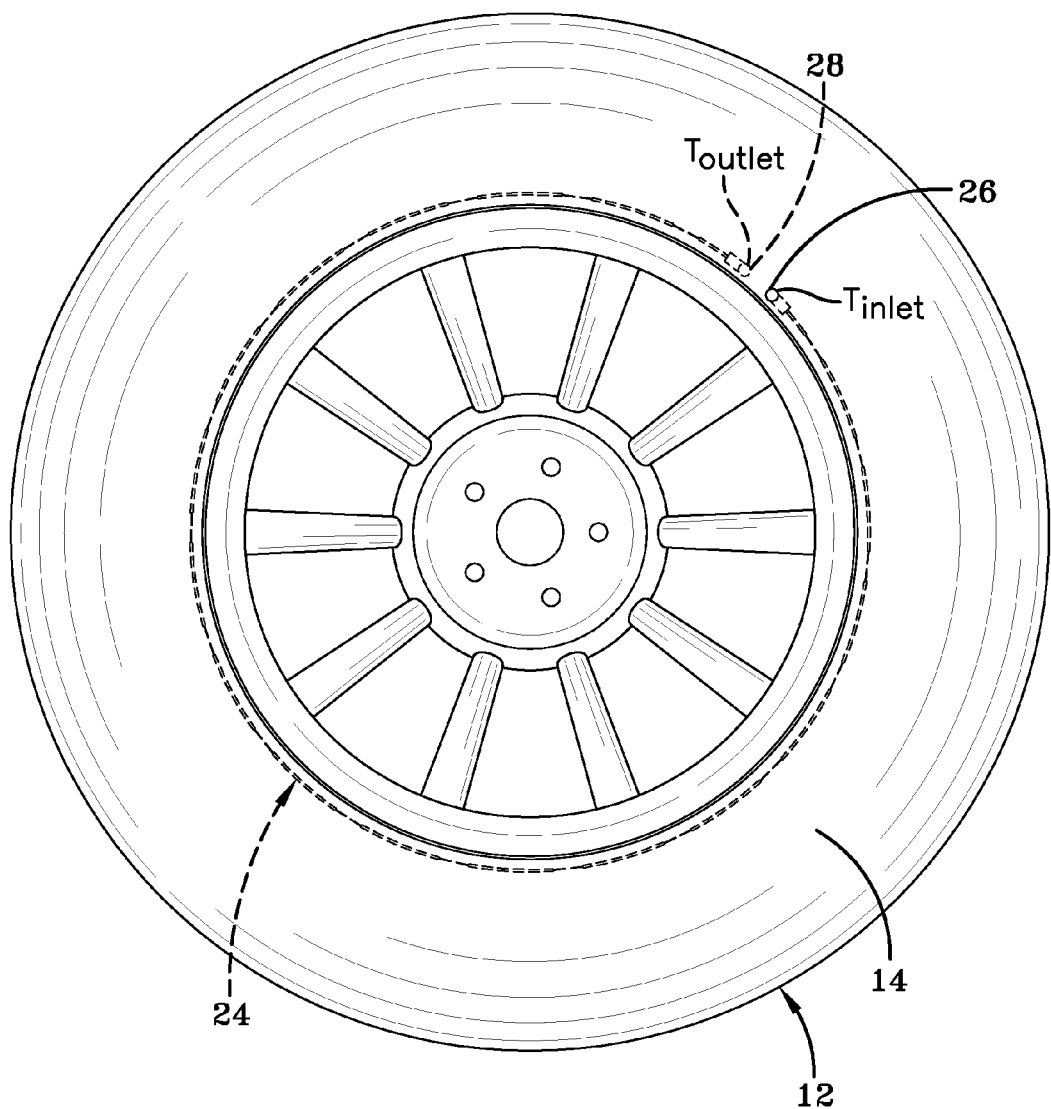
FIG. 2A is a side view of tire showing inlet, outlet and vein cavity location of 360 degree system.
Figure 3B:
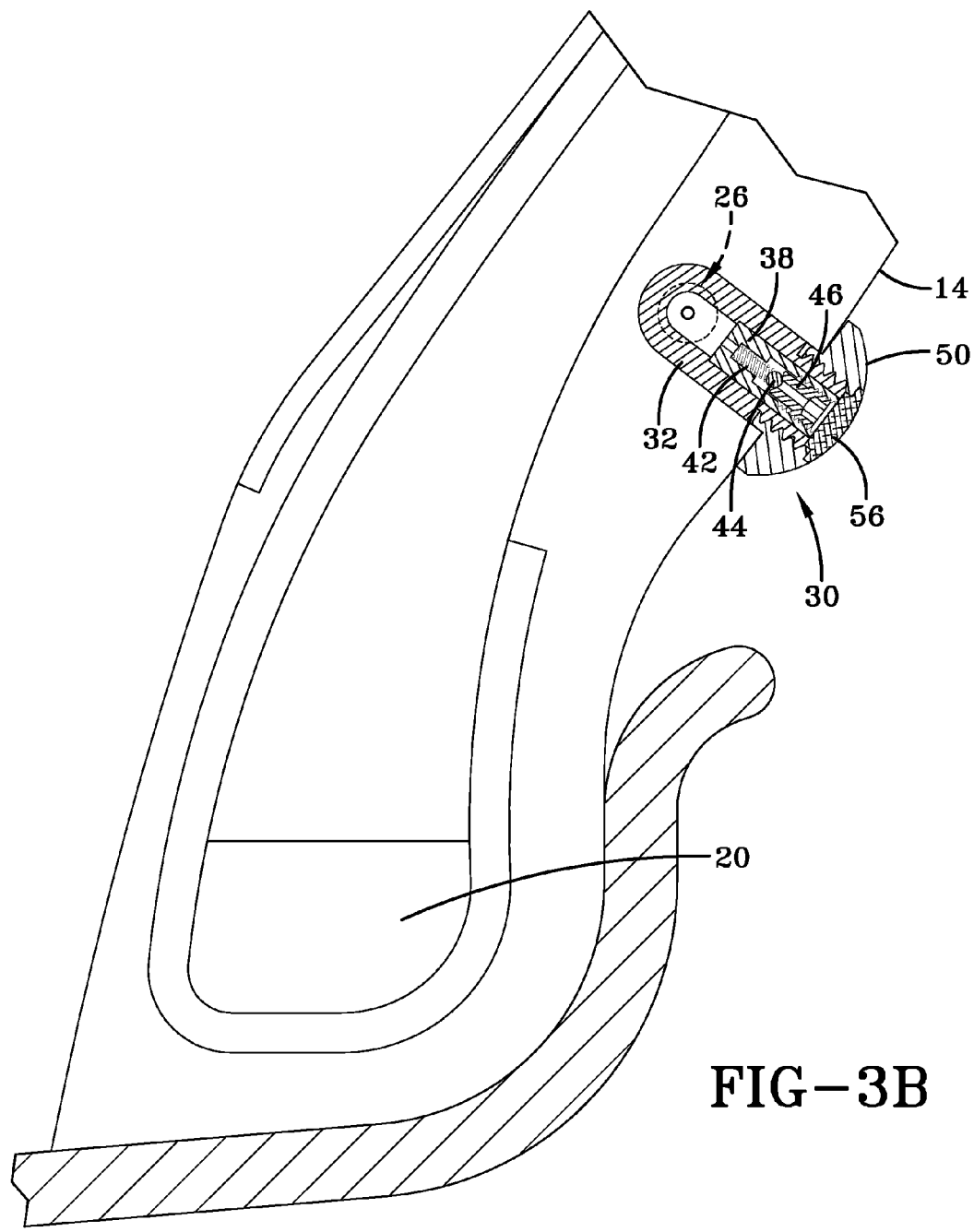
FIG. 3B is an enlarged view of the inlet taken from FIG. 3A.
Figure 4B:
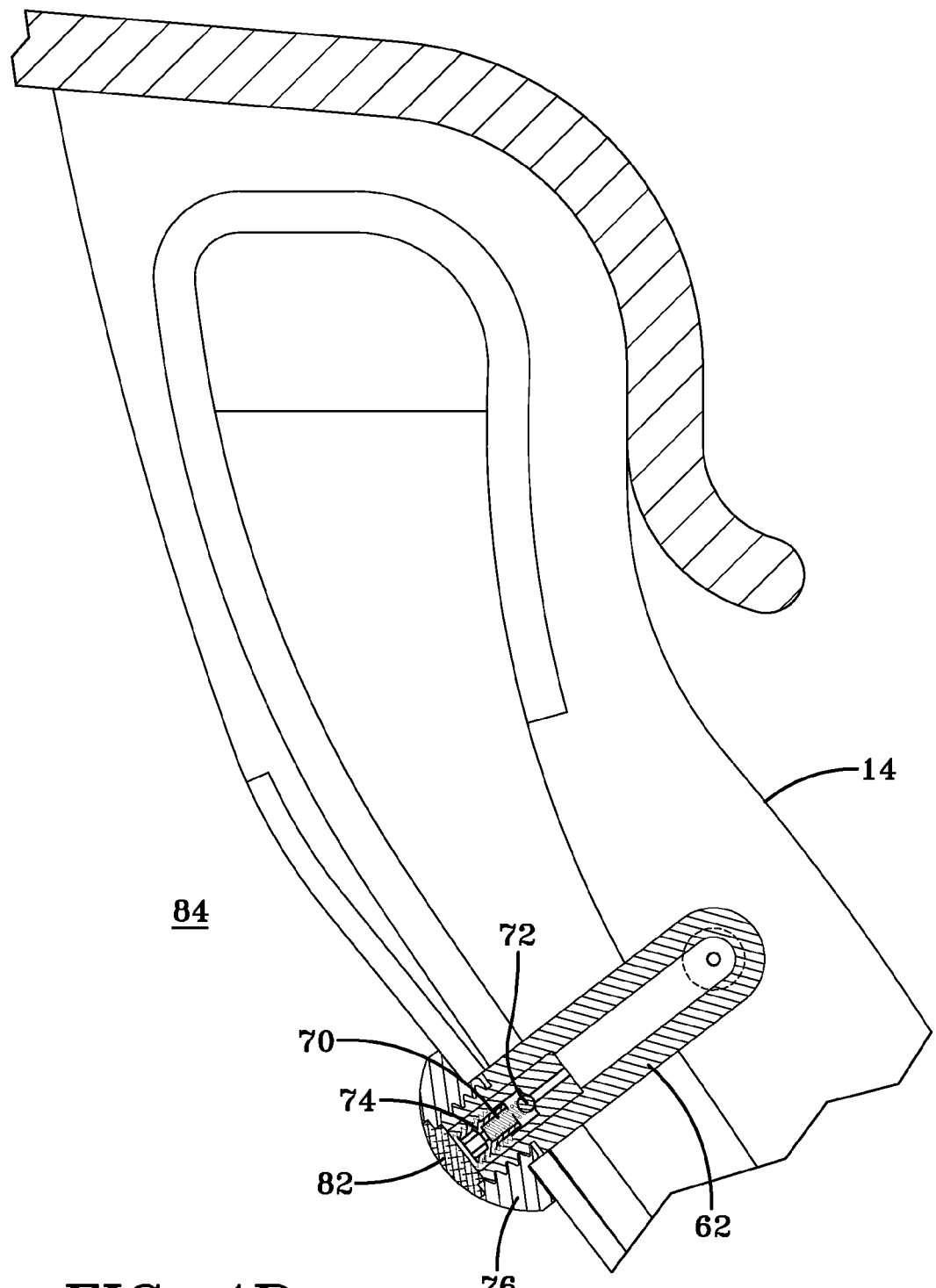
FIG. 4B is an enlarged view of outlet taken from FIG. 4A.
Figure 5A:
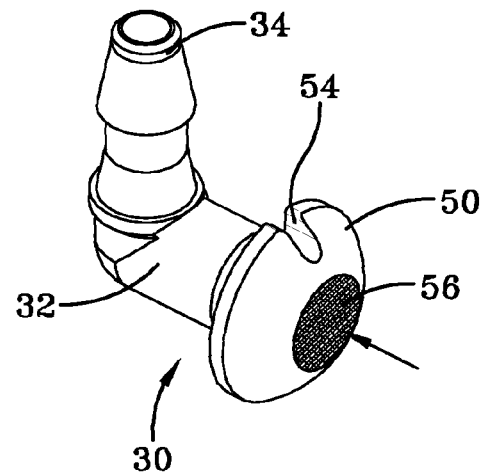
FIG. 5A is a perspective view of inlet.
Figure 5B:
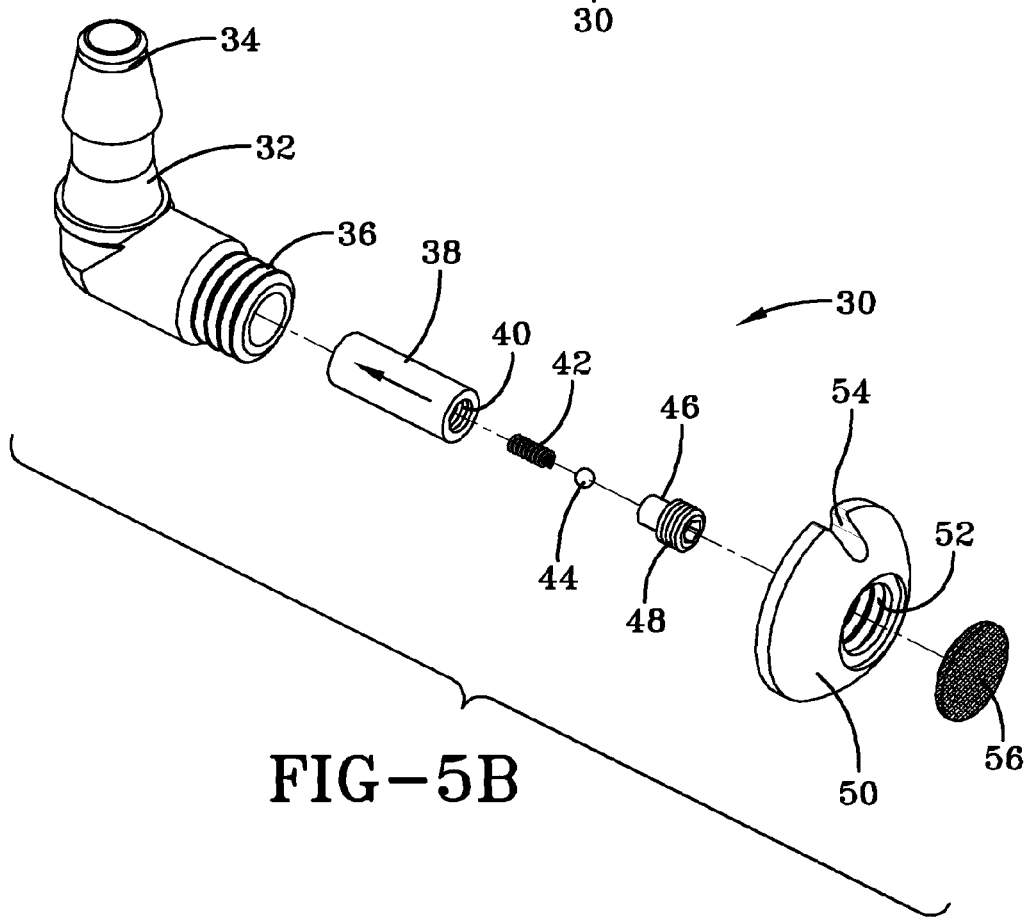
FIG. 5B is an exploded perspective view of inlet.
Figure 6A:
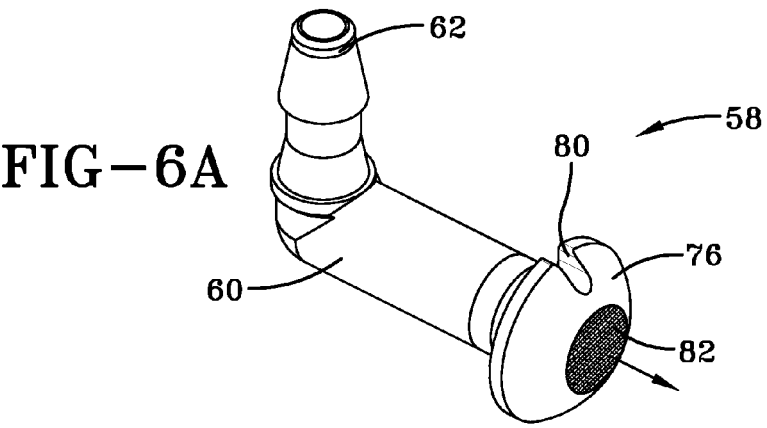
FIG. 6A is a perspective view of outlet.
Figure 6B:
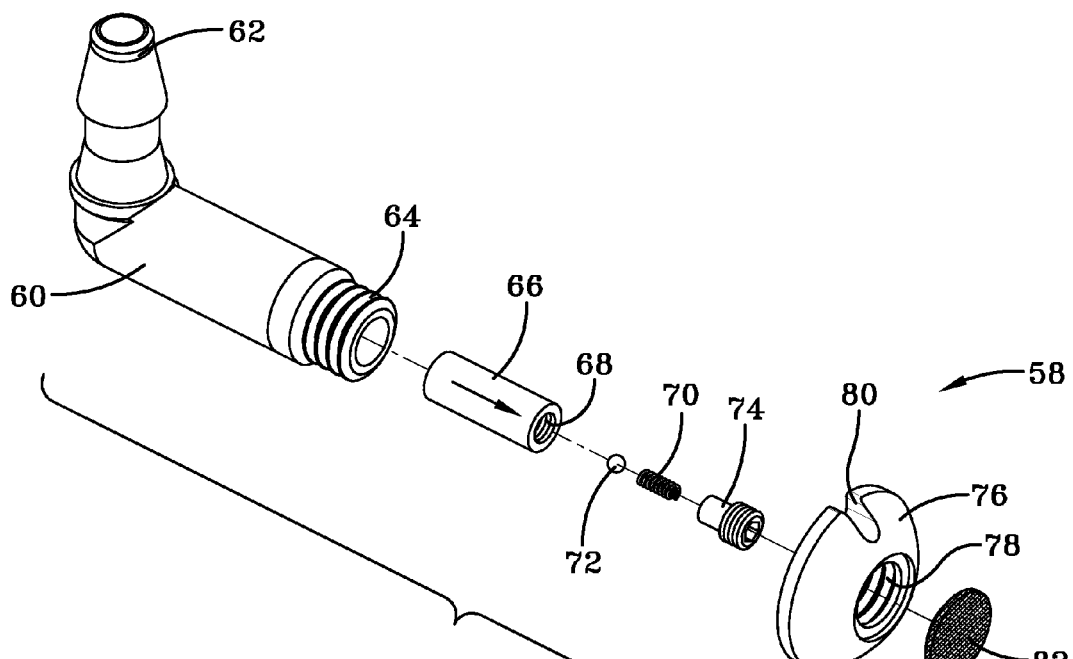
FIG. 6B is an exploded perspective view of inlet.

Referring to FIGS. 1, 2A, 2B, 3A and 3B, a tire assembly 10 includes a tire 12 of conventional construction having a pair of sidewalls 14, 16 extending from respective beads 20, 22 to a tire tread 18. As part of the assembly, one or more elongate air passageway(s) 24 are incorporated into respective tire component(s). The passageway 24 of the subject disclosure is shown as integrated into tire sidewall 14 but it will be appreciated that multiple passageways may be deployed in one or both sidewalls if desired. The air passageway 24 extends internally within the sidewall 14 between an air inlet portal 26 ($T_{inlet}$) opening to receive air into the passageway and an air outlet portal 28 ($T_{outlet}$) operative to direct air from the passageway toward a tire cavity 86.

The passageway 24 constitutes an air pumping vein mechanism operating to pump air from outside of the tire into the tire cavity as the tire rotates, whereby maintaining the tire air pressure at an optimal level. An inlet valve 30 is mounted at the inlet portal 26 and an outlet valve 58 at the outlet portal 28. The inlet valve 30, as shown in FIGS. 3A, 3B, 5A and 5B is configured as a ball-type valve having an elbow connector housing 32 extending from a passageway-coupling end 34 to an inlet end 36. The connector housing 32 has a through-bore which receives a cylindrical sleeve member 38 having an internally threaded through-bore 40. A biasing spring 42 seats within the bore 40 and a ball member 44 seats within the bore 40 against the biasing spring 42. A retainer ferrule 46 having a through bore is externally threaded at 48 and threads into the sleeve member 38 to hold the inserted components 42, 44 in place. The sleeve 38 inserts into the inlet end 36 of the connector body and an assembly cap 50 is internally threaded at 52 to engage over the connector end 36. A porous filter member 56 seats within the cap 50. The cap is provided with a notch 54 along an outer circumferential surface for the purpose of orientation of the assembly.

The completely assembled inlet valve 30 when attached to the connector housing will allow the entry of ambient air through the filter member 56 and into the valve sleeve 38. The spring 42 biases the valve ball member 44 into a closed position until a pressure at a down stream side of the valve falls below a preset level. When the pressure is below the preset level, the valve opens and allows air to pass into the valve and then into the inlet portal 26 of the passageway. When the pressure at the downstream side of the inlet valve 30 is at or above the threshold pressure, the ball member 44 is biased by spring 42 into a closed position, whereby closing air flow through the inlet valve 30.

The outlet valve 58 operates in a comparable manner to the inlet valve 30. As seen in FIGS. 4A, 4B, 6A and 6B, the outlet valve 58 includes an elbow connector housing 60 having a through-bore extending between a passageway coupling end 62 and an outlet end 64. The connector housing 60 receives a cylindrical sleeve member 66 having an internally threaded through-bore 68. A biasing spring 70 seats within the bore 68 and a ball member 72 seats within the bore 68 against the biasing spring 70. A retainer ferrule 74 having a through bore is externally threaded and threads into the sleeve member 66 to hold the inserted components 70, 72 in place. The sleeve 66 inserts into the outlet end 64 of the connector housing 60 and an assembly cap 76, internally threaded along a through-bore 78, engages over the connector housing end 64. A porous filter member 82 seats within the cap member 76. The notch 80 in each cap 76 is for orientation of the assembly.

The complete assembled outlet valve 58 attaches to the air passageway 24 at the outlet portal 28. Air pumped along the passageway 24 exits the passageway through valve 58. The spring 70 within valve 58 biases the valve ball member 72 into a closed position until a pressure within the tire cavity 84 falls below a preset desired level. When the pressure is below the preset level, the valve 58 opens and allows air to pass from the passageway 24 into the tire cavity 84, whereby maintaining the tire air pressure at a desired level. When the cavity air pressure is at or above the desired level, the ball member 72 is biased by spring 70 into a closed position, whereby closing air flow from passageway 24 into the tire cavity 84.

Referring to FIGS. 7 through 10, the air passageway 24 is configured integrally within a tire component such as a sidewall or tread component. The passageway 24 is constructed as a series or string of relatively wide elongate cavities 86 alternating with and interconnected by narrower and shorter, elongate connector channels. For the purpose of illustration, only a portion of the passageway 24 is represented by the singular cavity 86 in alternative embodiments of FIGS. 7 through 10, with a pair of the narrow, connector channels 88, 90 adjoining the cavity on opposite sides. It will be appreciated that the actual passageway 24 will comprises a repeating alternating series of multiple cavities and connecting channels. Thus constructed, the passageway 24 forms a vein operable to pump inlet air from the inlet portal 26 along the passageway 24 to the outlet portal 28 as the tire rotates. The outlet air is directed from the outlet portal 28 to the tire cavity as explained previously. The principle, as explained in more detail below, is to push air from cavity into a second cavity and then a third cavity until the air is forced from the passageway 24 into the tire cavity, whereby re-inflating the cavity to a desired pressure.

The cavities 86 in each embodiment of FIGS. 7 through 10 are generally of larger diametric dimension than the interconnecting connector channels (88, 90). A maximum length L2 of each cavity is a footprint length of the tire. The length L is at least or a minimum of 10 mm. The connecting channel between two cavities 86 has a maximum diametric width within a range of 5 to 50 percent of a maximum diametric dimension of each of the cavities 86 and the connecting channels 88, 90 are at least 5 mm in length.

Figure 7:
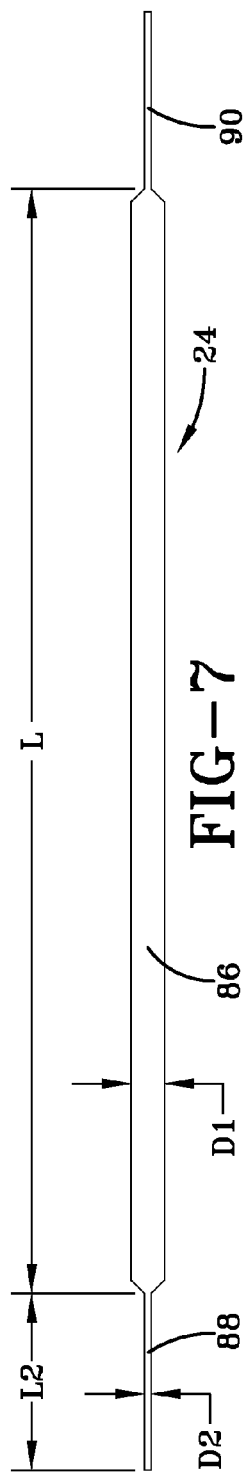
FIGS. 7 through 10 are alternative embodiments of four types of cavity shapes.
Figure 8:
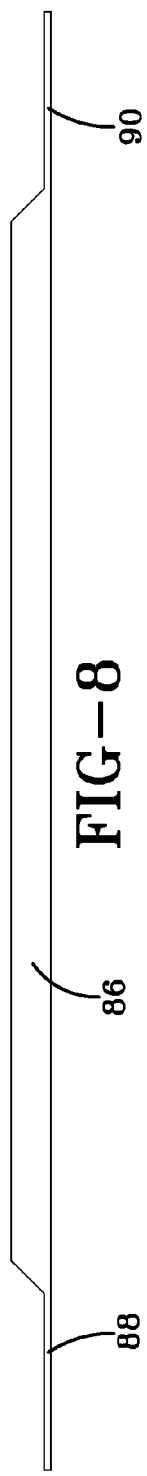
Figure 9:
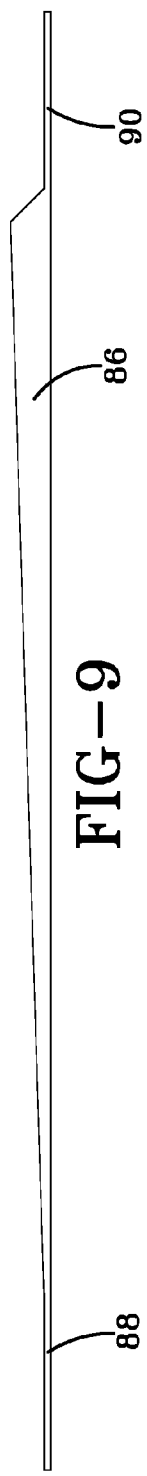
Figure 10:
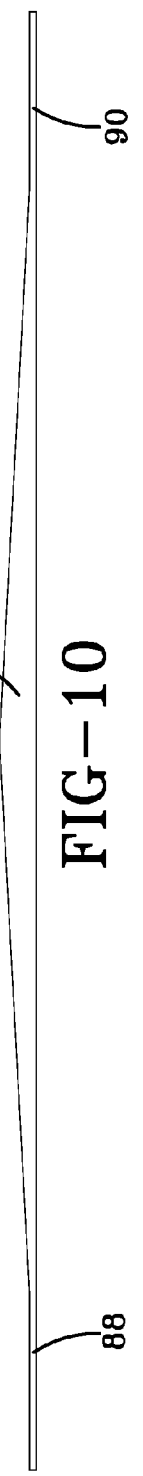

The alternative embodiments of FIGS. 7 through 100 show cavity configuration options. In FIG. 7, a symmetrical cavity of constant diameter is shown. FIG. 8 shows an alternative in which the cavities have a wider width dimension than FIG. 7, whereby more pressure generation by each cavity through compression is possible. FIG. 9 shows a cavity increasing in width from both ends to a cavity center. In FIG. 9, the cavity 86 increases gradually in width or diameter from one end to the opposite end. This configuration is accordingly a directional pumping alternative, capable of pumping air only in the direction in which the cavity is increasing diametrically. FIGS. 7, 8 and 10, in contrast, are bi-directional cavity configurations, capable of pumping air in either direction.

Figure 11:
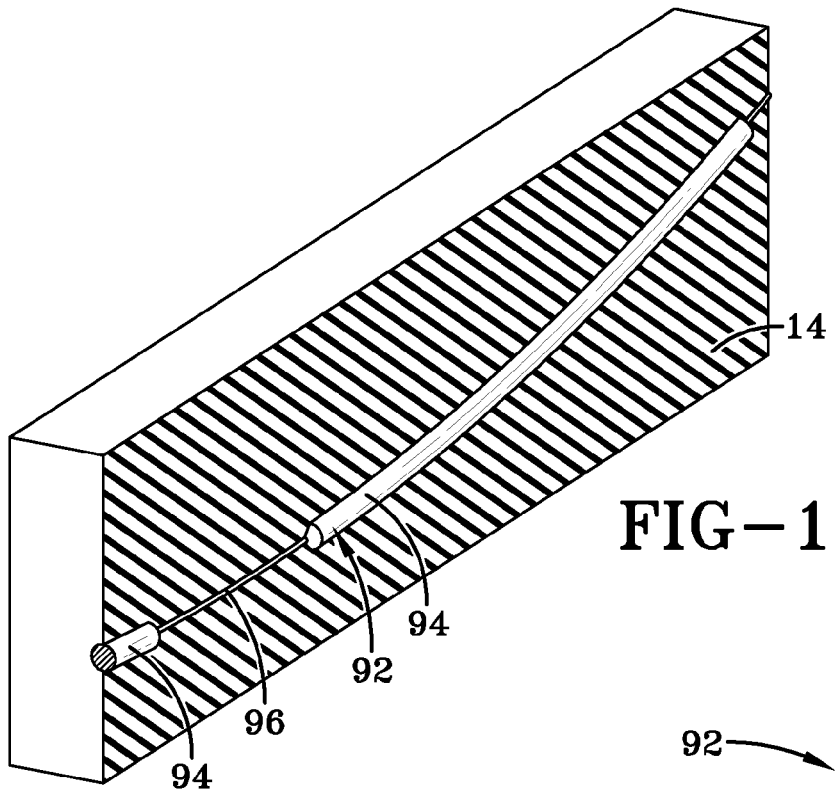
FIG. 11 is a section view of core in place to create vein cavity.
Figure 12:
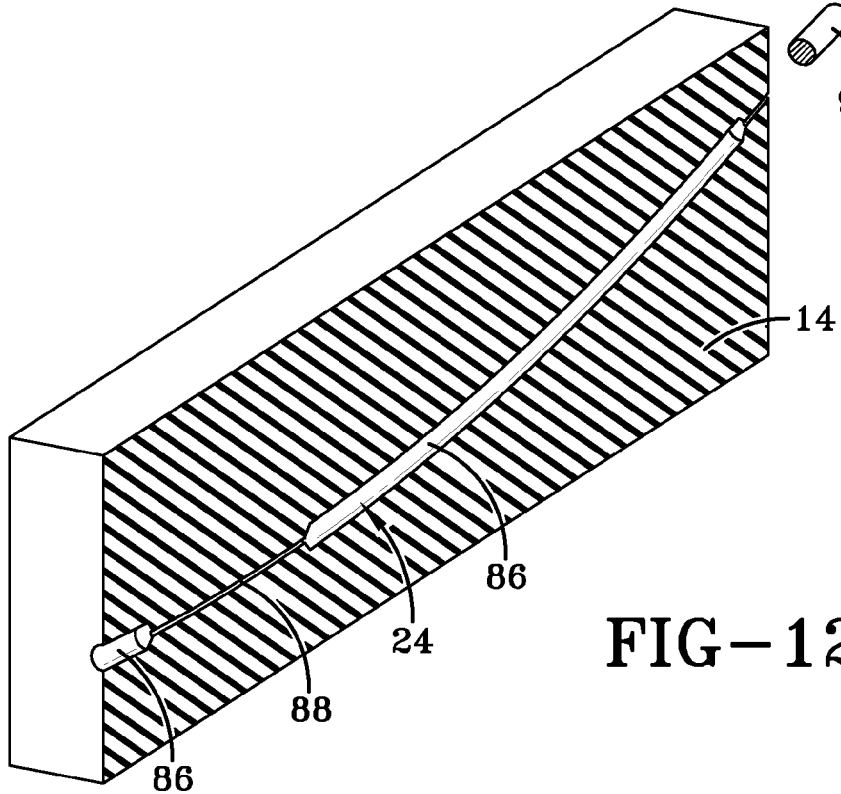
FIG. 12 is a section view of core removed leaving vein cavity.

The invention is intended to create a series or string of cavities 86 to push air from one cavity into a second cavity into a third cavity, etc., until the forced air exits the outlet portal 28 and is directed into the tire cavity 84. The passageway 24 may be formed into a sidewall or tread component during tire manufacture as will be seen from FIGS. 11 and 12. An insert 92 is placed within the tire component during tire build and cure, the insert 92 having cavity-forming regions 94 and connector channel-forming regions 96. Once the tire is formed and cured, the insert 92 is removed leaving a passageway 24 of intended cavity 86/channel 88 configuration as shown in FIG. 12. The passageway 24 may be formed by any known technique such as by sidewall insert or an internal core removed after tire cure.

Figure 13:
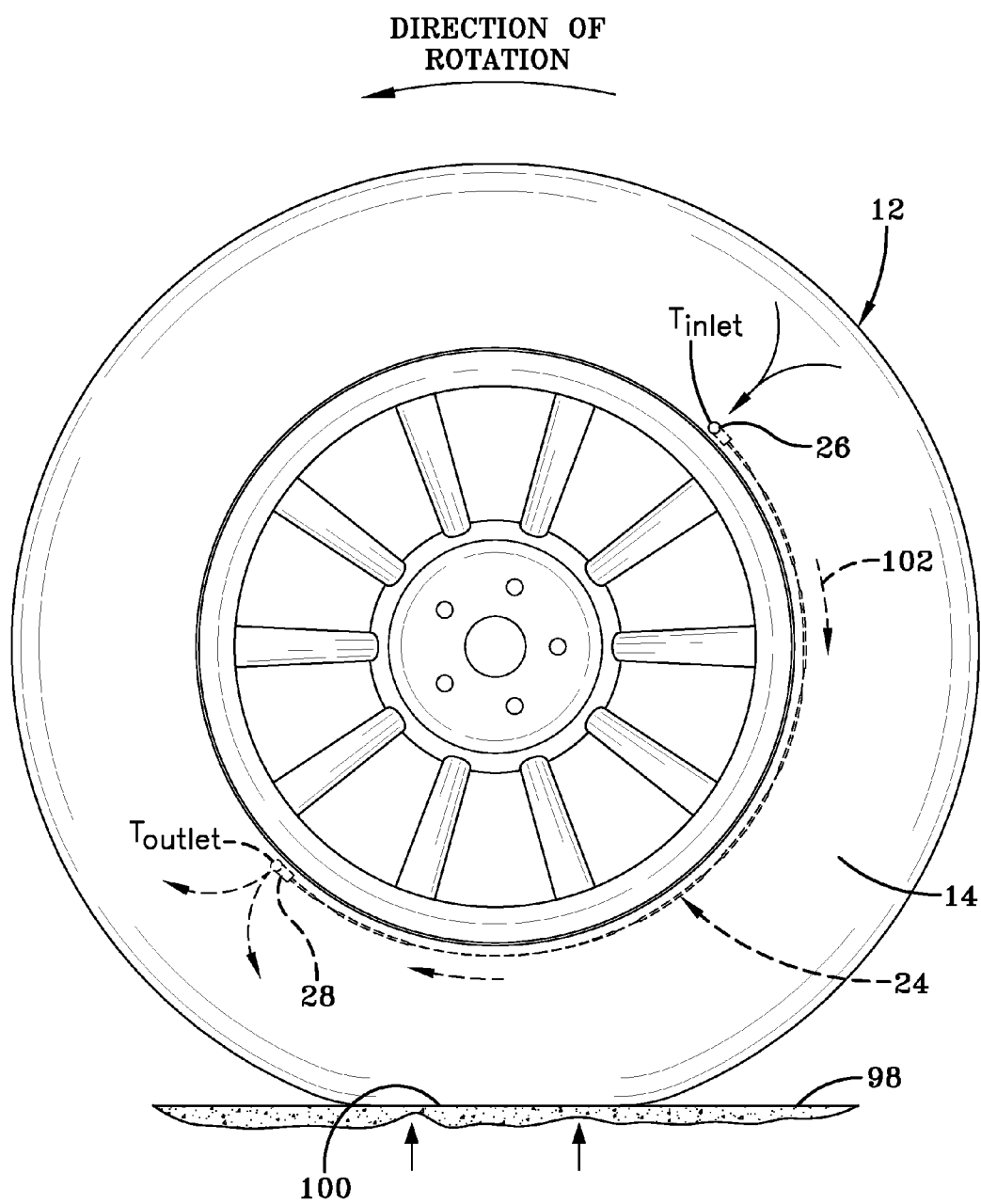
FIG. 13 is a side view of tire with vein cavities showing tire rotation and air flow direction through vein cavities.
Figure 15:
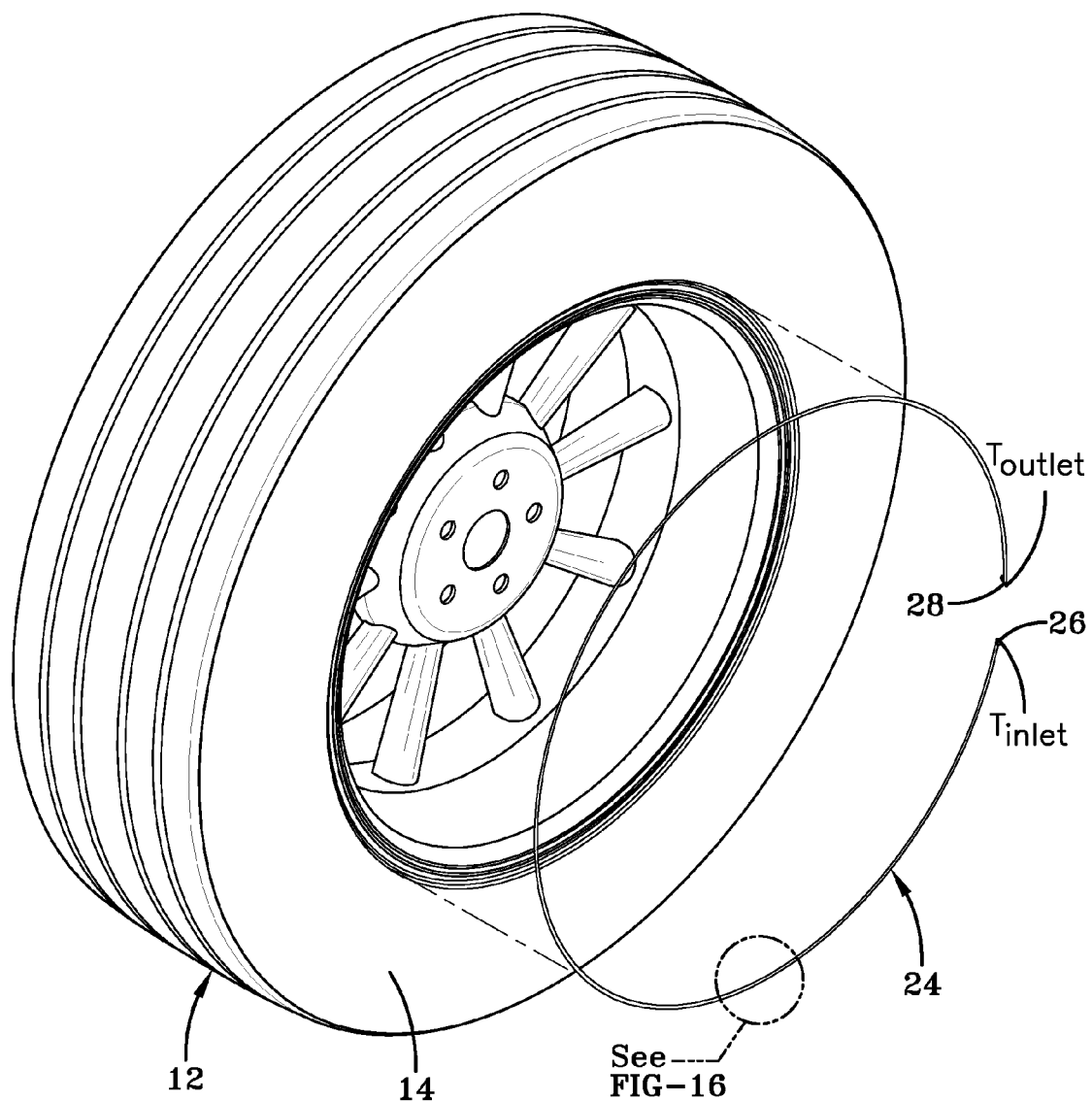
FIG. 15 is a perspective front view of tire showing inlet, outlet and vein tube location for a 360 degree system.
Figure 16:
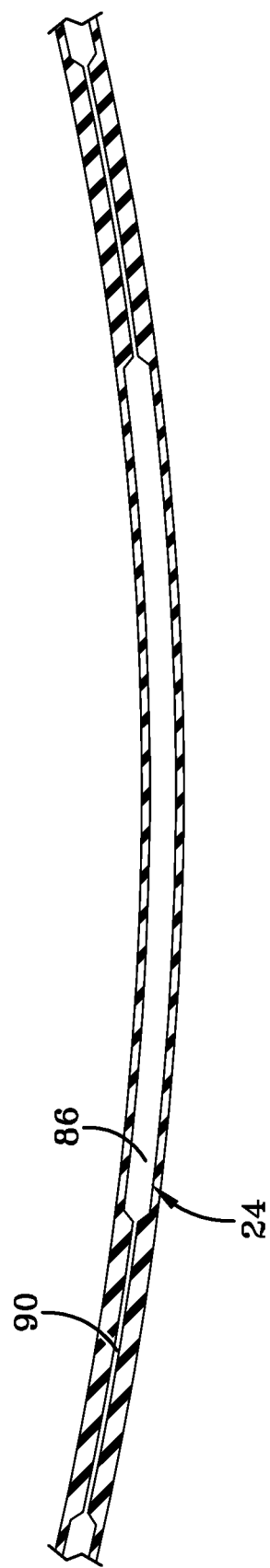
FIG. 16 is an enlarged section view of vein tube taken from FIG. 15.

The principle of the air pumping system within a rolling tire is shown by FIG. 13. As the tire rotates in the indicated direction, the passageway 24 is sequentially flattened segment by segment, forcing air in the direction of arrow 102. Engagement of the tire against ground surface 98 causes the segment of passageway 24 opposite of the tire footprint 100 to be squeezed and constricted. This forces air along the passageway 24. Air is accepted into the vein or passageway 24 by means of inlet valve 30 communicating with the air outside the tire. The outlet valve 58 at an opposite end of the passageway 24 communicates air evacuated from the passageway 24 into the tire cavity 84. The passageway 24 in FIG. 13 extends substantially along a 180 degree path around the sidewall 14 between the inlet portal 26 and the outlet portal 28. FIG. 15 shows a 360 degree air passageway 24 formed within and substantially circumscribing the sidewall 14. As with the 180 degree version of FIG. 13, the 360 degree air passageway extends between the inlet and outlet portals 26, 28 which are fitted with valving such as inlet valve 30 and outlet valve 58 (not shown) described previously.

Figure 14A:
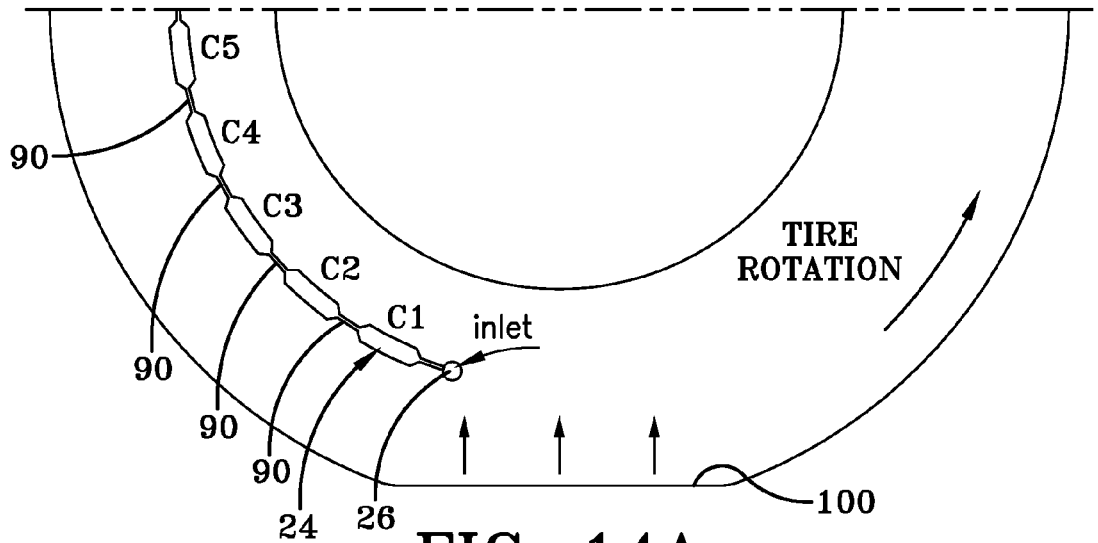
FIG. 14A through E are diagrammatic views depicting air flow moving from cavity to cavity as the tire rotates.
Figure 14B:
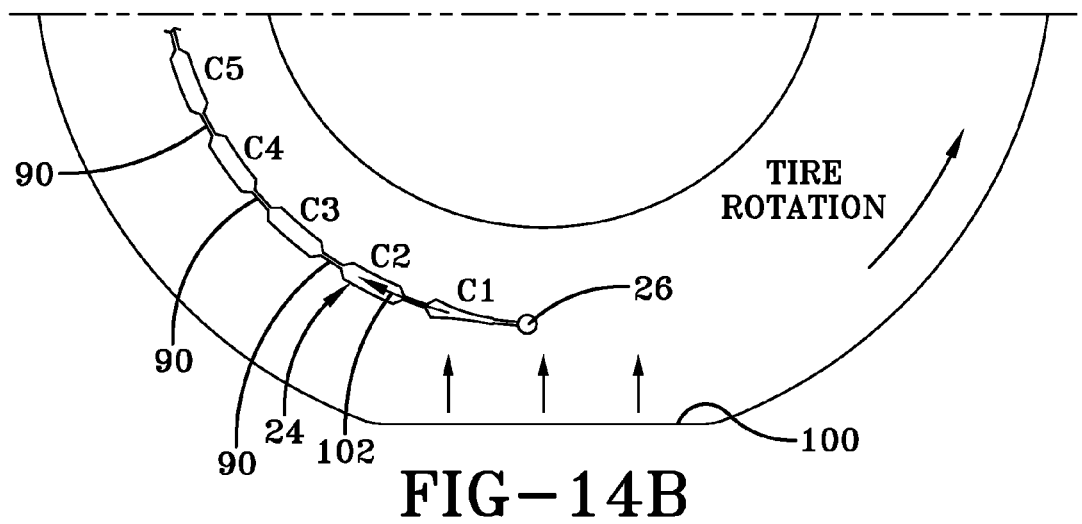
Figure 14C:
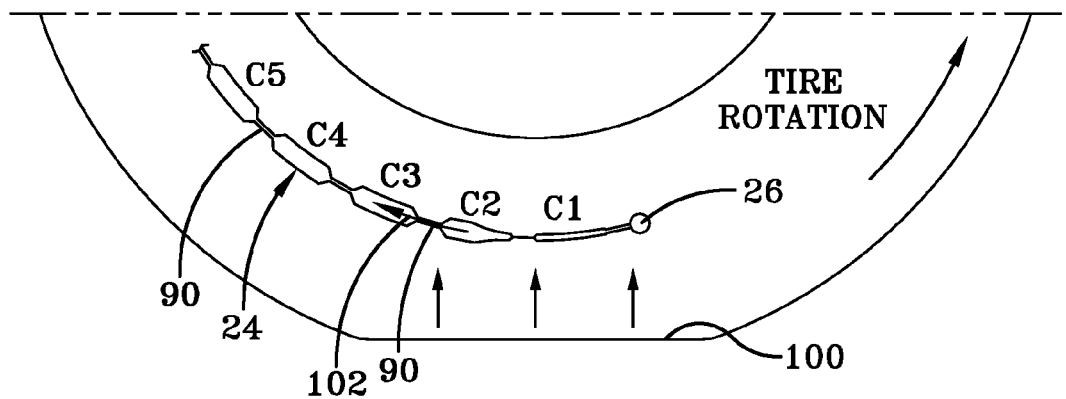
Figure 14D:
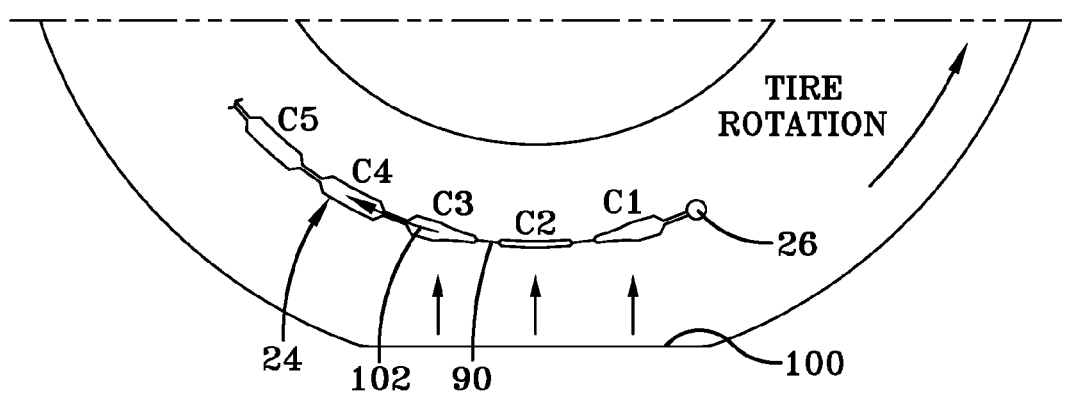
Figure 14E:
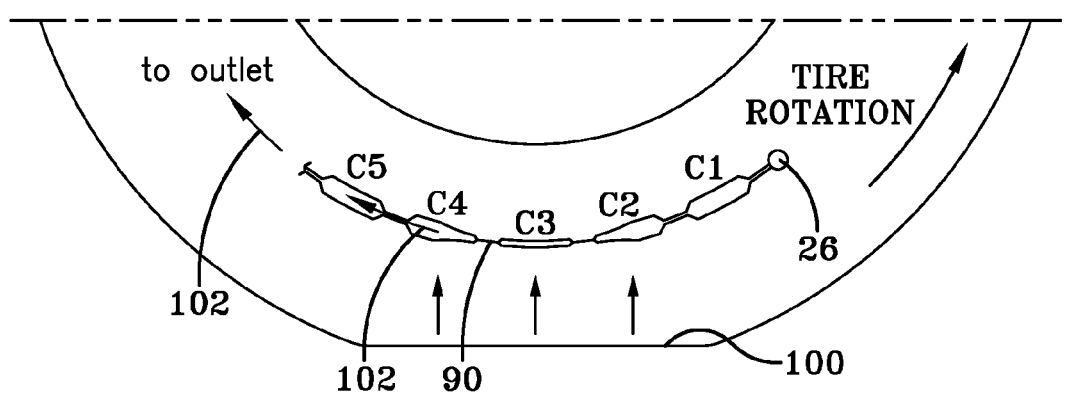

All of the cavities 86 have a larger diametric width (e.g. 1.5 mm) than the connector channels 88 (e.g. 0.3 mm) with adjacent cavities separated and connected by a small diametered connector channel. As will be seen from FIGS. 13 and 14A through 14E, the vein concept under which air passageway 24 operates through the sequentially squeezing of cavities 86 one by one as the cavities roll through positions opposite the rolling tire footprint. When the tire rolls, air taken into the passageway 24 through inlet portal 26 is accepted into cavity C1. As cavity C1 enters a position opposite the footprint 100 (FIG. 14B), cavity C1 is squeezed, pushing air into cavity C2 by means of connector channel 90. The cavity C1 need not be completely collapsed to push air through the connector channel 90 and into cavity C2. As the connector channel 90 between the cavities C1, C2 enters into position opposite the rolling tire footprint 100, because of the small diameter of connector channel 90, it will completely be squeezed closed with the tire deflection.

As the tire continues to incrementally roll further (FIG. 14C), the cavity C1 is in its collapsed state, air has been forced into cavity C2, and connector channel 90 between C1 and C2 is fully closed. As cavity C2 enters into position opposite the footprint 100, the cavity C2 is progressively collapsed, forcing the air therein in direction 102 and into the cavity C3 by means of connector channel 90 between C2 and C3. As cavity C1 leaves its position opposite the rolling tire footprint (FIG. 14D), cavity C1 is released and reopens to air intake through inlet portal 26. Air is thus progressively and sequentially pushed from cavity to cavity (FIG. 14E) until it reaches the outlet portal 28. The valve 58 will open if the air pressure within the tire cavity 84 is below a desired threshold level set by the spring bias within the valve, thus directing air from the air passageway 24 into the tire cavity.

While a five cavity system, C1 through C5 is shown for illustration purposes in FIGS. 14A through 14D, more or fewer cavities may be deployed into an air passageway if desired without departing from the invention. The length of each cavity, L approximately equal to 50 mm in the example shown, is selected to be less than a compressed zone at the rim level. Stated differently, the length L will be selected to be less than the footprint length of the tire as it rotates so as to effect the progressive sequential collapse of cavities (e.g. C1 through C5) one by one.

The "vein" operating principle of the subject invention has advantages over a system employing an air passageway pumping mechanism of constant diametric dimension. In a constant diameter system, a complete collapse of a segment opposite a rolling tire footprint is required to push air along the passageway and avoid any back-leakage of air. Obtaining a complete collapse of the air passageway requires a precise location of the air passageway to obtain the requite force necessary for a complete collapse. In the subject system, in contrast, different cavities (C1 through C5 e.g.) are created in series, adjacent cavities linked by a small diameter connector channel that functions as a valve. A small deformation of the tire is sufficient to cause a small deformation in the cavity opposite a rolling tire footprint. This small deformation in cavity C1 will cause air to flow through a small connector channel into the adjacent cavity C2 with a little further tire rotation. Because the connector channel is sized diametrically small, the force on the channel will be sufficient to close the connector channel (valve) and prevent air backflow. Because of the inherent valving provided by the small diameter connector channels, location of the air passageway is less critical and the air pumping system of the invention is less sensitive to tire loading.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. For example, the invention is not limited to the passageway cavity and connector channel configurations shown or the preferred dimensional specifications of the passageway cavities and channels. It is, therefore, to be understood that changes can be made in the particular embodiments described which will be within the full intended scope of the invention as defined by the following appended claims.

What is claimed is:

1. A tire assembly comprising:
a tire having a tire cavity, first and second sidewalls extending respectively from first and second tire bead regions to a tire tread region;
at least one elongate air passageway formed within a tire component, the air passageway comprising a series of elongate cavities, adjacent cavities connected end to end by an elongate tubular connecting channel having a diametric size smaller than a cavity diametric size;
wherein the connecting channel forms an unobstructed uniform-diameter tubular air-flow pathway end to end at the smaller diametric size, whereby the connecting channel operatively allows an unobstructive bidirectional air flow at the smaller diametric size between the adjacent cavities responsive to opposite directions of rotation of the tire;
and the air passageway being contained within an elastic tire compound material operative to sequentially at least partially collapse each cavity sequentially as the cavities pass sequentially over a rolling tire footprint, whereby air is pumped from cavity to cavity through the connecting channel between an air passageway air inlet and an air passageway air outlet.

2. The tire assembly of claim 1, wherein the adjacent cavities have a respective elongate length (L) sized operatively to compress one cavity at a time above a rolling tire footprint.

3. The tire assembly of claim 2, wherein a maximum length (L) of each cavity is a footprint length of the tire.

4. The tire assembly of claim 1, wherein the length (L) is at least 10 mm.

5. The tire assembly of claim 1, wherein the connecting channel has a maximum diametric width within a range of 5 to 50 percent of a maximum diametric dimension of each of the cavities and the connecting channel is at least 5 mm in length.

6. The tire assembly of claim 1, wherein each cavity of the air passageway resiliently returns to an unflattened condition when repositioned by tire rotation outside the rolling tire footprint.

7. The tire assembly of claim 6, wherein the air passageway follows an arcuate path within the tire component.

8. The tire assembly of claim 7, wherein the one tire component comprises the first tire sidewall.

9. The tire assembly of claim 8, wherein the arcuate path extends substantially 180 degrees around the first tire sidewall.

10. The tire assembly of claim 8, wherein the arcuate path extends substantially 360 degrees around the first tire sidewall.

11. A method for pumping air for maintenance of air pressure within a tire cavity of a rolling tire, the tire being of a type having a tire cavity, first and second sidewalls extending respectively from first and second tire bead regions to a tire tread region;
the method comprising:
deploying at least one elongate air passageway within a tire component, the air passageway comprising a series of elongate cavities, adjacent cavities connected end to end by an elongate tubular connecting channel;
sizing the connecting channel to have a channel diametric size smaller than a cavity diametric size;
forming the connecting channel to have an unobstructed uniform diameter tubular configuration end to end at the smaller diametric size, wherein the connecting channel operatively allowing an unobstructive bidirectional air flow at the smaller diametric size between the adjacent cavities responsive to opposite directions of rotation of the tire;
locating the air passageway within an elastic tire compound material operative to sequentially at least partially collapse each cavity sequentially as the cavities pass sequentially over a rolling tire footprint; and
pumping air from a cavity through the connecting channel to an adjacent cavity as the air passageway sequentially collapses between an air passageway air inlet and an air passageway air outlet.

12. The method of claim 11, wherein further comprising sizing the adjacent cavities to provide a respective elongate length (L) operative to compress one cavity at a time opposite a rolling tire footprint.

13. The method of claim 12, wherein the length (L) of each cavity is a substantially a footprint length of the tire.

14. The method of claim 12, wherein the length (L) is at least 10 mm.

15. The method of claim 12, wherein the connecting channel has a maximum diametric width within a range of 5 to 50 percent of a maximum diametric dimension of each of the cavities and the connecting channel is at least 5 mm in length.

16. The method of claim 11, wherein further comprising configuring the air passageway to follow an arcuate path within the tire component.

17. The method of claim 11, wherein further comprising placing the air passageway in the first tire sidewall.

18. The method of claim 17, wherein further comprising configuring the air passageway to extend substantially 180 degrees around the first tire sidewall.

19. The method of claim 17, wherein further comprising configuring the air passageway to extend substantially 360 degrees around the first tire sidewall.

* * * * *